(12) United States Patent
Graf et al.

(10) Patent No.: US 10,808,582 B2
(45) Date of Patent: Oct. 20, 2020

(54) DRIVE COMPONENT FOR A MOTOR VEHICLE, AND MOTOR VEHICLE

(71) Applicant: AUDI AG, Ingolstadt (DE)

(72) Inventors: Philip Graf, Kornwestheim (DE); Andreas Kopp, Kösching (DE)

(73) Assignee: AUDI AG, Ingolstadt (DE)

( * ) Notice: Subject to any disclaimer, the term of this patent is extended or adjusted under 35 U.S.C. 154(b) by 176 days.

(21) Appl. No.: 16/086,925

(22) PCT Filed: Apr. 20, 2017

(86) PCT No.: PCT/EP2017/059439
§ 371 (c)(1),
(2) Date: Sep. 20, 2018

(87) PCT Pub. No.: WO2017/182587
PCT Pub. Date: Oct. 26, 2017

(65) Prior Publication Data
US 2019/0101032 A1    Apr. 4, 2019

(30) Foreign Application Priority Data

Apr. 22, 2016  (DE) .......................... 10 2016 206 841

(51) Int. Cl.
*F01M 11/00* (2006.01)
*F16H 57/04* (2010.01)
(Continued)

(52) U.S. Cl.
CPC .......... *F01M 11/0004* (2013.01); *F01M 5/00* (2013.01); *F01M 5/021* (2013.01);
(Continued)

(58) Field of Classification Search
CPC ...... F01M 11/0004; F01M 5/00; F01M 5/021; F01M 2005/023; F01M 2011/0045;
(Continued)

(56) References Cited

U.S. PATENT DOCUMENTS 4,296,716 A   10/1981  Hofbauer et al.
5,540,300 A   7/1996   Downs et al.
(Continued)

FOREIGN PATENT DOCUMENTS

CN   101813016 A   8/2010
CN   103119256 A   5/2013
(Continued)

OTHER PUBLICATIONS

International Search Report with English translation and Written Opinion dated Jul. 19, 2017 of corresponding International Application No. PCT/EP2017/059439; 14 pgs.
(Continued)

*Primary Examiner* — Joseph J Dallo
*Assistant Examiner* — Kurt Philip Liethen
(74) *Attorney, Agent, or Firm* — Maier & Maier, PLLC

(57) ABSTRACT

A component for a motor vehicle, with at least one receiving space for structural elements of the drive component, with at least one first wall that delimits the receiving space at least partially, by way of which at least one collecting region for collecting a lubricant for lubricating the structural elements is delimited at least partially, and with at least one second wall, which is arranged on a side of the first wall that faces away from the collecting region, and which is spaced apart from the first wall at least in a partial region, so that, between the walls, an intermediate space that is delimited at least partially by the walls is formed. For setting a heat transfer coefficient between the walls, a liquid can be introduced into the intermediate space and discharged out of the intermediate space.

9 Claims, 1 Drawing Sheet

(51) Int. Cl.
*F01M 5/00* (2006.01)
*F01M 5/02* (2006.01)
*F03G 7/06* (2006.01)

(52) U.S. Cl.
CPC ............... *F03G 7/06* (2013.01); *F16H 57/04* (2013.01); *F16H 57/0413* (2013.01); *F16H 57/0417* (2013.01); *F01M 2005/023* (2013.01); *F01M 2011/0045* (2013.01)

(58) Field of Classification Search
CPC .. F16H 57/04; F16H 57/0413; F16H 57/0417; F03G 7/06
See application file for complete search history.

(56) References Cited

U.S. PATENT DOCUMENTS

| | | | |
|---|---|---|---|
| 6,155,135 A | | 12/2000 | Gage et al. |
| 7,213,682 B2 * | | 5/2007 | Gibson ............... F16H 57/0421 |
| | | | 184/6.12 |
| 8,302,506 B2 * | | 11/2012 | Iwata ................. F16H 57/0447 |
| | | | 74/606 R |
| 8,672,094 B2 * | | 3/2014 | Quehenberger .... F16H 57/0419 |
| | | | 184/6.12 |
| 2001/0047996 A1 | | 12/2001 | Weingaertner |
| 2009/0020366 A1 | | 1/2009 | Mori et al. |
| 2015/0211395 A1 * | | 7/2015 | Gooden ................. F01M 5/007 |
| | | | 165/280 |
| 2016/0010520 A1 * | | 1/2016 | Will ....................... F01M 5/021 |
| | | | 123/196 AB |
| 2016/0265402 A1 * | | 9/2016 | Bruestle ................. F01M 5/002 |
| 2019/0048991 A1 * | | 2/2019 | Zhang ................. F16H 57/0423 |
| 2019/0162291 A1 * | | 5/2019 | Gerges ................ F16H 57/0483 |

FOREIGN PATENT DOCUMENTS

| | | | | |
|---|---|---|---|---|
| DE | 4431105 A1 | | 3/1996 | |
| DE | 19938688 A1 | | 2/2001 | |
| DE | 102008059619 A1 | | 2/2010 | |
| DE | 102011122419 A1 | | 6/2013 | |
| EP | 0872632 A1 * | | 10/1998 | .............. F02F 7/008 |
| EP | 1077314 A1 * | | 2/2001 | ......... F01M 11/0004 |
| JP | H03-294611 A | | 12/1991 | |
| JP | 2006-275039 | | 10/2006 | |
| WO | 2012/035426 A1 | | 3/2012 | |

OTHER PUBLICATIONS

Examination Report dated Dec. 9, 2016 of corresponding German Application No. 102016206841.5; 8 pgs.
International Preliminary Report on Patentability and Written Opinion dated Nov. 1, 2018 in corresponding International Application No. PCT/EP2017/059439; 6 pages.
Chinese Office Action dated Apr. 10, 2020, in connection with corresponding CN Application No. 201780024296.2 (10 pgs., including machine-generated English translation).

* cited by examiner

DRIVE COMPONENT FOR A MOTOR VEHICLE, AND MOTOR VEHICLE

FIELD

The invention relates to a drive component for a motor vehicle and to a motor vehicle having such a drive component.

BACKGROUND

Such a drive component for a motor vehicle may be taken as being already known from DE 44 31 105 A1, for example. The drive component has at least one receiving space for structural elements of the drive component, with the receiving space being formed, for example, by a housing of the drive component. The structural elements are, for example, power transmission elements, which can move relative to one another and/or relative to the housing. The drive component has at least one first wall, which delimits the receiving space at least partially, and which, for example, is formed by the housing or by a housing element of the housing. By way of the wall or by the wall, at least one collecting region for collecting a lubricant for lubricating the structural elements is at least partially delimited. This means that, when the drive component is operated, the structural elements are supplied lubricated and/or cooled with the lubricant, which is formed as an oil or lubricating oil, for example, in order to keep the wear of the structural elements especially slight. After the structural elements have been cooled and/or lubricated, the lubricant can flow away from the structural elements and collect, for example, in the collecting region, as a result of which a sump of the lubricant forms in the collecting region, for example. If the lubricant is an oil, then the sump is formed, for example, as an oil sump.

The drive component further has at least one second wall, which is arranged on a side of the first wall that faces away from the collecting region. For example, the second wall is formed by the housing or by a housing element of the housing. The second wall is spaced apart from the first wall in at least a partial region, so that an intermediate space, which is delimited at least partially by the walls is formed between the walls. The intermediate space is, for example, a gap, which extends between the walls and, on the one hand, is delimited by the first wall, and, on the other hand, by the second wall.

In this case, for adjustment of a heat transfer or setting a heat transfer coefficient between the walls, a liquid can be introduced into the intermediate space and discharged out of the intermediate space. In other words, at least a part of the intermediate space can be flushed with liquid, so that the liquid is taken up in at least a part of the intermediate space. This results, for example, in the setting or formation of a first heat transfer coefficient in the intermediate space and accordingly between the walls.

If the liquid is discharged out of the intermediate space, so that, for example, no liquid is taken up in the intermediate space, then the intermediate space is an air gap, for example. A second heat transfer coefficient is thereby set or formed, for example, in the intermediate space and accordingly between the walls. The second heat transfer coefficient is, for example, smaller than the first heat transfer coefficient, in particular when the liquid is an oil, such as, for example, the aforementioned lubricating oil.

Furthermore, DE 199 38 688 A1 discloses a method for regulating a cooling of lubricating oil in an oil pan of a drive machine with forced circulation of lubricant, with the oil being collected in an oil pan, which, at least in part, is formed of a double-walled construction. In this case, it is provided that, when there is an increased cooling need, the lubricating oil is forced to circulate in the double-walled region of the oil pan, and that, when there is a small cooling need, the lubricating oil is essentially held at rest in the double-walled region of the oil pan.

Known from U.S. Pat. No. 4,296,716, moreover, is an internal combustion engine for a motor vehicle with an oil pan that is divided into two compartments.

SUMMARY

The object of the present invention is to further develop a drive component as well as a motor vehicle of the kind mentioned in the beginning in such a way that the heat transfer coefficient between the walls can be realized in a manner that is especially appropriate to the need and is particularly simple.

A first aspect of the invention relates to a drive component for a motor vehicle, in particular an automobile, such as, for example, a passenger motor vehicle. The drive component has at least one receiving space for structural elements of the drive component. For example, the receiving space is delimited by a housing of the drive component. The structural elements are, for example, power transmission elements, which, for example, can move relative to one another and/or relative to the housing.

The drive component further has at least one first wall, which delimits the receiving space at least partially and which is formed, for example, by the housing or by a housing element of the housing. By way of the first wall or by the first wall, at least one collecting region for collecting a lubricant for lubricating the structural elements at least partially is delimited. For example, when the drive component is operated, the structural elements are supplied with the lubricant, which is formed as an oil or lubricating oil, for example, as a result of which the structural elements are cooled and/or lubricated. After the structural elements have been supplied with the lubricant, the lubricant can flow away from the structural elements and collect in the collecting region, for example. The lubricant thereby forms a sump, for example, in the collecting region, which, for example, is then also referred to as an oil sump when the lubricant is an oil.

For example, by means of at least one pump, the lubricant can be transported out of the collecting region and then, for example, be transported back to the structural elements, as a result of which the structural elements can be supplied again with the lubricant.

The drive component further comprises at least one second wall, which is formed, for example, by the housing or by a housing element of the housing. The second wall is thereby arranged on a side of the first wall that faces away from the collecting region. Furthermore, the second wall is spaced apart from the first wall at least in a partial region, so that an intermediate space, which is at least partially delimited by the walls, is formed between the walls. The intermediate space is, for example, a gap, which extends between the walls and is delimited, on the one hand, by the first wall and, on the other hand, by the second wall.

In this case, for adjustment of a heat transfer or setting a heat transfer coefficient between the walls, a liquid can be introduced into the intermediate space and discharged out of the intermediate space. This means that the intermediate space can be flooded with the liquid, so that the liquid is taken up or arranged at least in a part of the intermediate space. A first heat transfer or a first heat transfer coefficient, for example, is thereby established or set between the walls.

By discharging the liquid out of the intermediate space, the liquid is not taken up or arranged in the intermediate space or in the aforementioned part of the intermediate space, so that the intermediate space is formed, for example, as an air gap. A second heat transfer or a second heat transfer coefficient, for example, is thereby established or set between the walls. For example, the second heat transfer coefficient is smaller than the first heat transfer coefficient. By setting the second heat transfer coefficient between the walls, it is possible by way of the intermediate space, for example, to isolate the lubricant received in the collecting region from the second wall and, in particular, from the surroundings of the second wall, so that, for example, an excessive heat transfer from the lubricant that is present in the collecting region to the second wall via the first wall can be prevented. It is thereby possible, for example, to realize a rapid heating of the lubricant, so that losses, in particular frictional power losses, of the drive component can be kept small.

However, if the lubricant has a high temperature, which may require an effective cooling of the lubricant, then, for example, the first heat transfer coefficient can be set such that an especially good heat transfer can occur from the lubricant present in the collecting region, via the first wall and the liquid arranged in the intermediate space, to the second wall and, in particular, to the surroundings of the second wall facing away from the first wall. Excessively high temperatures of the lubricant can be prevented in this way, because, through setting of the first heat transfer coefficient, an especially good dissipation of heat, that is, a dissipation of an especially large amount of heat can be ensured by the lubricant.

In accordance with the invention, then, in order to be able to realize the heat transfer or the heat transfer coefficient between the walls in a manner that is especially appropriate to need as well as particularly simple and accordingly advantageous in terms of cost, packing space, and weight, at least one reservoir, which is in fluidic connection with the intermediate space, is provided for receiving the liquid. Furthermore, in accordance with the invention, at least one displacement element is provided, which can be moved at least partially into the reservoir in order to thereby bring about a displacement of at least a part of the liquid out of the reservoir into the intermediate space. For example, the displacement element can be moved between an initial position and at least one displacement position, in particular relative to the walls. For example, in the displacement position, in comparison to the initial position, the displacement element is arranged further into the reservoir, so that, for example, through movement of the displacement element from the initial position to the displacement position, at least a part of the liquid that is received in the reservoir is displaced out of the reservoir into the intermediate space by means of the displacement element. Said displacement of the liquid is understood to mean that at least a part of the liquid—because it is displaced by means of the displacement element—flows out of the reservoir and flows into the intermediate space.

If, for example, the displacement element is again moved back from the displacement position into the initial position, then the previously displaced liquid, for example, can again be received in the reservoir and accordingly discharged out of the intermediate space. Accordingly, the drive component according to the invention makes it possible to realize an especially need-based setting of the heat transfer coefficient between the walls in a particularly simple and accordingly cost-effective manner.

Here, the invention is particularly based on the following realization: In drive components, such as, for example, gearboxes or transmissions, axle drives, and bearing points of vehicles, lubricants, such as, for example, oils, are employed for improving tribological properties. The lubricants reduce friction and make possible a dissipation of heat, in particular in power transmission elements of the drive components. In this case, the dissipation of heat is made possible by creating a heat transfer between the power transmission elements, the housing, and, accordingly, the ambient air surrounding the housing. The properties of the respective lubricant and of the housing define here, in particular in regard to their respective thermal conductivity, the heat transfer coefficient and accordingly, together with a contact surface and a flow rate, the amount of heat that can be dissipated. The properties of the respective lubricant and of the housing are usually chosen in such a way that power losses ensuing at higher load can be dissipated, and a critical, maximum temperature of the respective lubricant can be prevented.

In this case, conventional drive components usually do not make possible an adjustment, in particular a control or regulation, of the heat transfer coefficient between the power transmission elements and the housing or the surroundings of the housing. Through the previously described, constant heat transfer coefficient, established for the maximum load, a major part of the resulting thermal energy is dissipated via the housing to the surroundings thereof even at low loads and low temperatures of the lubricant. This leads to a very slow heating of the lubricant, as a result of which the lubricant is operated for a very long time in a non-ideal temperature range. This results in undesired high power losses. In the case of the drive component according to the invention, the problems and drawbacks can be prevented in an especially simple way, because—in the described way—the heat transfer coefficient between the walls and accordingly between the lubricant and the surroundings of the second wall or of the housing overall can be set. It is thereby possible to solve the target conflict between a high dissipation of heat or energy at high loads and a low dissipation of heat or energy at contrasting low loads. In particular, it is possible to control or to regulate, in particular, the heat transfer coefficient between the walls and accordingly between the structural elements and the housing or the surroundings thereof in a load-dependent manner.

For setting the second heat transfer coefficient, for example, the liquid is discharged at least partially, in particular at least for the most part or completely, out of the intermediate space, so that the intermediate space is designed or functions, for example, as an air gap. At low temperatures of the lubricant, on account of the lower thermal conductivity of air in comparison to liquid taken up in the intermediate space when the second heat transfer is set, said air gap can serve as an insulation of the lubricant with respect to the housing or the surroundings thereof. Accordingly, it is preferably provided that the liquid has a larger heat transfer coefficient than does air. In particular, it can be provided that the liquid is a lubricant, in particular an oil, with the liquid being, for example, the identical or the very same lubricant that can collect in the collecting region. As a consequence of setting the second heat transfer coefficient, any occurring power loss is used for a rapid heating of the lubricant.

At high temperatures of the lubricant, the intermediate space is flooded partially or completely with the liquid, which is formed as an oil, for example, as a result of which the larger first heat transfer coefficient, in comparison to the second heat transfer coefficient, is set in the intermediate space and accordingly between the walls. In other words, the heat transfer coefficient, which is also referred to as a thermal conductivity coefficient, is increased by introducing the liquid into at least a part of the intermediate space. When compared to the second heat transfer coefficient, this results in an increased dissipation of thermal energy by the lubricant, as a result of which the temperature thereof can be kept at a non-critical maximum value.

It can be seen overall that, through the especially need-related introduction and discharge of the lubricant into or out of the intermediate space, the heat transfer coefficient between the walls can be adjusted as necessary. Through this adjustment of the heat transfer coefficient, the dissipation of energy to the surroundings or environment is reduced at low loads in comparison to conventional drive components. Any energy losses that occur can thereby be used efficiently for a rapid heating of the lubricant. In this case, the lubricant is brought especially rapidly in the operating range to a lower viscosity and is operated therein. This leads to greater degrees of efficiency of the power transmission elements, in particular in comparison to solutions in which it is only possible to adjust contact surfaces via which the lubricant can come into contact with particular elements.

In an advantageous embodiment of the invention, at least one actuating element is provided, the form and/or the volume of which can be changed as a consequence of a change in temperature of the actuating element, as a result of which the movement of the displacement element into the reservoir can be brought about. A change in the form of the actuating element is understood to mean a change in at least one extension or at least one outer dimension of the actuating element, with it not being necessary for the actuating element also to change its geometric form as such. During the change in the volume, the actuating element changes its volume as a consequence of a change in temperature of the actuating element.

In other words, the actuating element changes its form, in particular its at least one extension or dimension, and/or its volume as a consequence of a change in temperature of the actuating element, as a result of which the actuating element brings about the movement of the displacement element into the reservoir. Accordingly, the displacement element is moved by means of the actuating element at least partially into the reservoir, as a result of which at least a part of the liquid taken up in the reservoir is forced out of the reservoir into the intermediate space. The use of the actuating element creates the basis for realizing a movement of the displacement element that is autonomous of energy sources or energy systems of the rest of the vehicle, so that the heat transfer coefficient can be set in an especially simple way as necessary. In particular, this embodiment creates the prerequisite that the actuating element is deformed autonomously or independently or automatically and/or in terms of its volume, without it being necessary for this purpose to resort to energy sources of the rest of the vehicle. It is thereby possible, for example, to dispense with an electrical connection of the drive component to an energy source of the rest of the vehicle, so that the construction of the drive component can be kept particularly simple. In consequence thereof, the costs and the weight of the drive component can be kept especially low.

In this case, it has been found to be especially advantageous when the actuating element is formed as an expansion element, which, as a consequence of a heating thereof, expands and thereby brings about the movement of the displacement element into the reservoir. Accordingly, the heating represents the previously described change in temperature of the actuating element. During such a heating of the actuating element, the actuating element expands and accordingly changes its form and/or its volume, in particular, in that at least one extension or one outer dimension of the actuating element becomes larger. As a result, for example, the actuating element exerts a force on the displacement element at least indirectly, by means of which the displacement element—as previously described—is moved at least partially into the reservoir. This embodiment makes possible the realization of an especially need-related and, at the same time, a particularly simple setting of the heat transfer coefficient, because the use of the actuating element and accordingly the movement of the displacement element can occur independently from the energy sources of the rest of the vehicle.

The heating of the actuating element and the expansion of the actuating element resulting thereby is produced, for example, by a heat transfer from the lubricant to the actuating element (expansion element). Accordingly, for example, if the lubricant heats up with ongoing operation of the drive component, then, for example, as a consequence of the previously described heat transfer from the lubricant to the actuating element, a heating of the actuating element occurs, without it being necessary to this end to resort to the energy sources of the rest of the vehicle. By the heating of the actuating element, at least a part of the liquid is introduced and, in particular, is displaced into the intermediate space, so that the first heat transfer coefficient is then set. In consequence thereof—as previously described—the lubricant can be cooled, this also being desired based on the increasing heating of the lubricant with ongoing operation of the drive component.

If, for example, the drive component is switched off, so that the lubricant as well as, if need be, the actuating element can cool down, then the actuating element can contract, for example, so that the previously mentioned, at least one extension or dimension of the actuating element again becomes smaller. In consequence thereof, the displacement element is moved at least partially out of the reservoir or can be moved out of the reservoir, so that the liquid that was previously displaced and initially taken up in the intermediate space again finds space in the reservoir and again can be taken up in the reservoir. In other words, the liquid can then again be introduced into the reservoir and, in particular, flow out of the intermediate space into the reservoir, as a result of which the second heat transfer coefficient is then set. When operation of the drive component is restarted, the second heat transfer coefficient is set, so that the lubricant is insulated and heats rapidly, which, for example, is also desired in the course of a cold start or of a warming-up phase, because the lubricant initially has an undesirably low temperature when an operation of the drive component is started.

Overall, it can be seen that, in this embodiment, it is possible to set the heat transfer coefficient autarchically, that is, independently and, in particular, autonomously and automatically, of energy sources of the rest of the vehicle, so that the drive component need not be connected to energy sources of the rest of the vehicle. The motor vehicle can thereby be manufactured in a particularly simple, time-effective, and cost-effective way.

In order to be able to set the heat transfer coefficient as necessary in a particularly simple way, it has further been found to be advantageous when the actuating element has a higher thermal expansion coefficient than the lubricant and/or than the liquid.

Furthermore, it has been found to be especially advantageous when the actuating element is formed from wax. The actuating element is thereby a solid, for example, at 30 degrees at most, in particular at 20 degrees at most, and melts, for example, at 40 degrees at most, as a result of which a change in form occurs as an increase in the volume of the actuating element. In consequence thereof, the displacement element is moved. It was found that wax is suitable especially advantageously as the actuating element in order to be able to realize thereby an autonomous or automatic setting of the heat transfer coefficient.

It has been found to be especially advantageous when the reservoir is arranged at least partially, in particular, at least for the most part or completely, in the vertical direction of the vehicle below the intermediate space. This is understood to mean, for example, that, in the installed position of the drive component and in relation to the vertical direction of the vehicle, the reservoir is situated at least partially below the intermediate space, with the drive component assuming its installed position in the completely manufactured state of the motor vehicle. Through this arrangement of the reservoir, it is possible that, for setting the second heat transfer coefficient, the liquid that is initially taken up in the intermediate space flows or streams out of the intermediate space back into the reservoir owing to the force of gravity, in particular exclusively under the effect of gravity, so that the liquid is discharged independently from the energy sources of the rest of the vehicle, not only out of the reservoir into the intermediate space, but also out of the intermediate space, and can be introduced back into the reservoir. The heat transfer coefficient can thereby be set in an especially simple and cost-effective manner.

Another embodiment is characterized in that the displacement element, which can be moved at least partially in a first direction into the reservoir, is assigned at least one spring element, which can be tensioned by the movement of the displacement element for providing a spring force, by means of which the actuating element can be moved in a second direction that is opposite to the first direction. In other words, if the displacement element is moved in the first direction and thereby, for example, out of the initial position into the displacement position, then the spring element is tensioned, so that the spring element is tensioned in the displacement position more strongly than in the initial position, for example. Accordingly, at least in the displacement position, the spring element provides the aforementioned spring force, which acts on the displacement element at least indirectly. If, for example, the actuating element cools down, so that the actuating element contracts, then the spring element can relax at least partially, so that the displacement element is moved out of the displacement position and back into the initial position by means of the spring force. It is thereby possible to achieve an at least essentially autonomous operation, that is, an at least essentially autonomous setting of the heat transfer coefficient.

In another embodiment of the invention, at least one actuator or control element that is independent of energy sources of the rest of the vehicle is provided, by means of which the displacement element can be moved. This actuator or control element is the aforementioned actuating element, for example. Through this autonomous embodiment of the dependence in regard to setting the heat transfer coefficient, the drive component or the displacement element does not need to be connected in a complicated way to energy sources of the rest of the vehicle, so that the costs can be kept low.

Finally, it has been found to be advantageous when the drive component is designed as a transmission, in particular as an axle drive. Usually, it is provided that axle drives, in particular, are not connected to energy sources of the rest of the vehicle. This can also be avoided for the drive component according to the invention based on the previously described autonomous setting of the heat transfer coefficient, so that the costs can be kept especially low, while, at the same time, a need-related setting of the heat transfer coefficient can be realized.

A second aspect of the invention relates to a motor vehicle having at least one drive component according to the invention. Advantages and advantageous embodiments of the drive component according to the invention are to be regarded as advantages and advantageous embodiments of the vehicle according to the invention, and vice versa.

Further advantages, features, and details of the invention ensue from the following description of a preferred exemplary embodiment as well as on the basis of the drawing. The features and combinations of features mentioned in the description as well as the features and combinations of features mentioned below in the figure description and/or shown solely in the figures can be used not only in the respectively presented combination, but also in other combinations or alone, without leaving the scope of the invention.

BRIEF DESCRIPTION OF THE DRAWINGS

The drawing shows in.

In the figures, identical or functionally identical elements are furnished with the same reference numbers.

DETAILED DESCRIPTION

Figure 1:
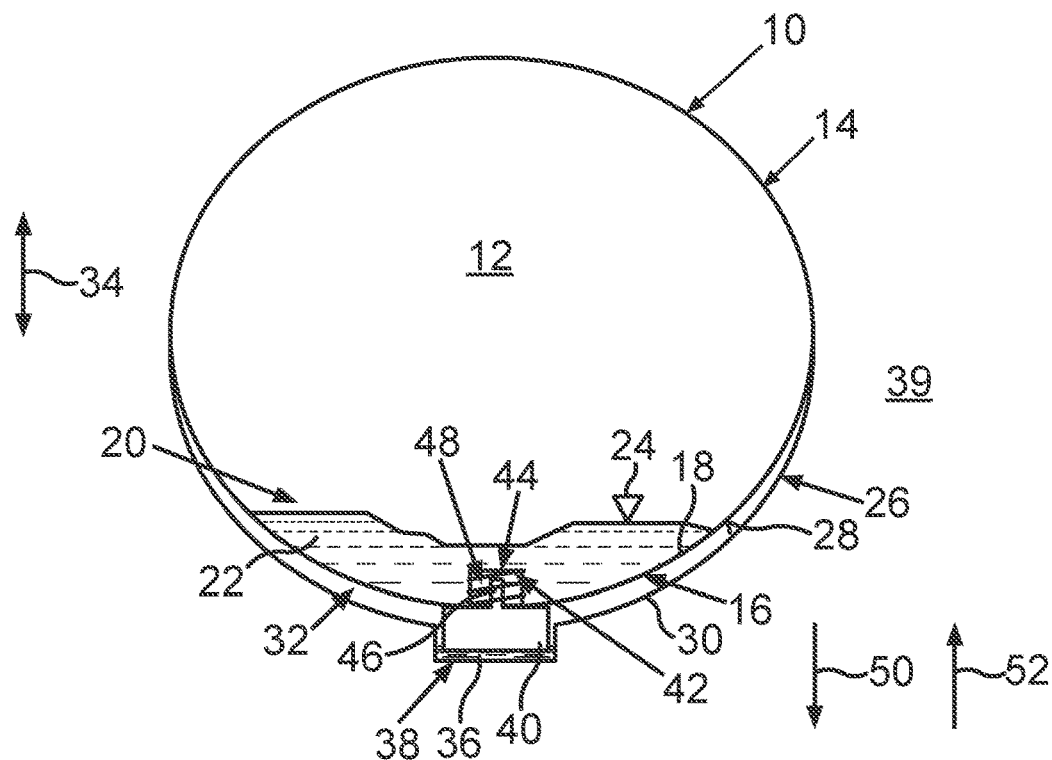
FIG. 1 as an excerpt, a schematic sectional view of a drive component according to the invention, the lubricant of which has a first temperature.

FIG. 1 shows, as an excerpt in schematic sectional view, a drive component, referred to in its entirety by reference 10, for a motor vehicle. For example, the drive component is a transmission, which, in particular, can be constructed as an axle drive. Such an axle drive is a differential transmission, which, during cornering, permits a speed compensation between the inside-curve and outside-curve wheel of an axle of the motor vehicle. The drive component 10 has at least one receiving space 12, which, for example, is formed or delimited by a housing 14 of the drive component 10. In the finished manufactured state of the drive component 10, the elements of the drive component 10, which are not depicted in FIG. 1, are arranged in the receiving space 12. Said structural elements are, for example, power transmission elements, which can move relative to one another and/or relative to the housing 14 and, in particular, can rotate and/or can undergo translational movement. For example, the structural elements are toothed gears, which can engage with one another.

The drive component 10 further has at least one first wall 16, which, for example, can be formed by the housing 14 and, in particular, by a housing element 18 of the housing 14. By way of the first wall 16, the receiving space 12 is at least partially delimited. Furthermore, by way of the first wall 16, a collecting region 20 for collecting a lubricant 22 is delimited, the level of which is indicated in FIG. 1 by reference 24. The lubricant 22 is an oil, which can also be referred to as a lubricating oil and is utilized for lubricating and/or cooling the structural elements. In this case, the collecting region 20 is arranged in the receiving space 12.

During an operation of the drive component 10, the structural elements are supplied with the lubricant 22, which, in the present case, is formed as a transmission oil, as a result of which the structural elements are lubricated or cooled. After the structural elements have been supplied with the lubricant 22, the lubricant can flow away from the structural elements and collect, for example, in the collecting region 20.

The drive component 10 further comprises at least one second wall 26, which is arranged on a side 28 of the first wall 16 that faces away from the collecting region 20. The second wall 26 is formed, for example, by the housing 14 and, in particular, by a housing element 30 of the housing 14. Because the wall 16 or the housing element 30 is arranged on the side 28 of the first wall 16 that faces away from the receiving space 12 and accordingly from the collecting region 20, the housing element 30 is also referred to as an outer housing element or as an outer housing, with the housing element 18 also being referred to as an inner housing or as an inner housing element.

The first wall 16 is, for example, formed by a thin-walled shell, in which the lubricant 22 can be collected, with said shell being insulated thermally, for example, in comparison to the housing 14, in particular in comparison to the housing element 30. Alternatively, it is conceivable that the walls 16 and 26 are formed by a double-walled design of the housing 14. It can be seen in FIG. 1 that the second wall 26 is spaced apart from the first wall in at least a partial region, so that, between the walls 16 and 26, an intermediate space 32, which is delimited at least partially by the walls 16 and 26, is formed.

The drive component 10 assumes its installed position in the completely manufactured state of the motor vehicle, with the drive component 10 being mounted in its installed position in the motor vehicle. Indicated here in FIG. 1 by a double arrow 34 is the vertical direction of the vehicle. Accordingly, it can be seen that the intermediate space 32 is arranged in the vertical direction of the vehicle at least partially below the collecting region 20 and accordingly below the lubricant 22, in particular in relation to the installed position of the drive component 10.

The intermediate space 32 is delimited, on the one hand, by the first wall 16 and, on the other hand, by the second wall 26. In the present case, in relation to the installed position, the intermediate space 32 is delimited in the vertical direction of the vehicle upward by the first wall 16 and downward by the wall 26. For setting a heat transfer coefficient between the walls 16 and 26, as explained in further detail below, a liquid 36, which, in the present case, is formed as an oil, can be introduced into the intermediate space 32 and can be discharged out of the intermediate space 32.

Through introduction of the liquid 36 into the intermediate space 32, the intermediate space 32 is flushed with the liquid 36, as a result of which a first heat transfer coefficient is set in the intermediate space 32 and accordingly between the walls 16 and 26. Because—as can be seen from FIG. 1—the intermediate space 32 is arranged between the lubricant 22 present in the collecting region 20 and the surroundings 39 of the housing 14, the introduction of the liquid 36 into the intermediate space 32 and the discharge of the liquid 36 out of the intermediate space 32 enable the heat transfer coefficient to be set at least in a partial region between the lubricant 22 and the surroundings 39.

Through discharge of the liquid 36 out of the intermediate space 32, a smaller heat transfer coefficient in comparison to the first heat transfer is set, because, when the second heat transfer coefficient is set, the intermediate space 32 is formed as an air gap, for example. This is the case, for example, because, through the discharge of the liquid 36 out of the intermediate space 32, air is introduced into the intermediate space 32. In this case, the liquid 36 has a higher heat transfer coefficient than does air.

Preferably, it is provided that, depending on the temperature of the lubricant 22 and/or depending on another parameter, the liquid 36 is introduced into the intermediate space 32 and is discharged out of the intermediate space 32. Through adjustment of the quantity of the liquid 36 that is received in the intermediate space 32, it is further possible to adjust a contact surface, by way of which the liquid 36 is in contact with the first wall 16 and, in particular, is in thermally conductive contact, so that the heat transfer coefficient between the walls 16 and 26 can be varied via the contact surface, and the heat transfer coefficient can be varied via the thermal conductivity of the liquid 36 in the intermediate space 32.

As explained in further detail below, the introduction of the liquid 36 into the intermediate space 32 as well as the discharge of the liquid 36 out of the intermediate space 32 can be brought about by at least one actuator or control element that is autonomous of energy sources or energy networks of the rest of the motor vehicle and in particular of vehicle-internal energy networks of the motor vehicle as well as by exploiting gravitation, that is, the force of gravity, with the actuator or control element also being referred to as a controller. Vehicle-internal energy networks are understood to mean, for example, mechanical, electric, and hydraulic energy sources.

In this case, in order to be able to set the heat transfer coefficient between the walls 16 and 26 in a particularly simple way as necessary, the drive component 10 comprises at least one reservoir 38, which is in fluidic connection with the intermediate space 32 and in which the liquid 36 is received or can be received. Furthermore, at least one displacement element, which is formed as a plunger 40, is provided, which can be moved at least partially into the reservoir 38 in order to thereby bring about a displacement of at least a part of the liquid 36 received in the reservoir 38 out of the reservoir 38 into the intermediate space 32.

Furthermore, at least one actuating element 42 is provided, which is mounted in a chamber 44. In this case, the actuating element 42 is the aforementioned actuator or control element that is autonomous of the energy sources of the rest of the motor vehicle and by means of which the plunger 40 can be moved. Here, a piston 46 of the plunger 40 protrudes into the chamber 44. The actuating element 42 is formed as an expansion element, which, as a consequence of a heating thereof, expands and accordingly changes its form and/or its volume. Through this expansion of the expansion element, the movement of the plunger 40 into the reservoir 38 is brought about. Accordingly, the plunger 40 is an actuated plunger, which is actuated, that is, is operated and accordingly is moved, by means of the actuating element 42. The actuating element 42 is, for example, a medium, which, as a consequence of a heating and subsequent cooling of the actuating element 42, can make changes in the aggregate state. In particular, it is provided that the expansion element expands when it is heated and again contracts during a subsequent cooling. Through the expansion of the actuating element 42, the plunger 40 is moved, with the actuating element 42 undergoing expansion as a function of its temperature. In this case, it is provided, in particular, that the actuating element 42 has a higher thermal expansion coefficient that does the lubricant 22 and/or than does the liquid 36.

Furthermore, at least one spring element 48 is provided, which is designed to provide a spring force, by means of which the displacement element (plunger 40) can be moved. Moreover, in relation to the installed position and in the vertical direction of the vehicle, the reservoir 38 is arranged below the intermediate space 32.

FIG. 1 shows the drive component 10 and accordingly the lubricant 22 and the actuating element 42 in a cold state, that is, at a first temperature. The actuating element 42 hereby completely fills, for example, the chamber 44, which provides a defined space. In this space (chamber 44), the piston 46 of the plunger 40 is also arranged. At the first temperature, for example, the spring element 48, which is designed as a return spring, is relaxed. At the first temperature, the plunger 40 frees up, for example, the reservoir 38, in particular the complete reservoir 38, for the liquid 36, so that—if the reservoir 38 is arranged in the vertical direction of the vehicle below the intermediate space 32—the liquid 36 can flow out of the intermediate space 32 owing to the force of gravity, that is, preferably exclusively under the effect of the force of gravity, into the reservoir 38. The intermediate space 32 is or will be thereby evacuated between the walls 16 and 26 and accordingly is or will be formed as an air gap. Accordingly, the heat transfer coefficient between the lubricant 22 in the inner housing element 18 and the outer housing element 30 is very small.

With ongoing operation of the drive component 10, said component heats up, so that, for example, the lubricant 22 also heats up. In consequence thereof, for example, a heat transfer can occur from the lubricant 22 to the actuating element 42, in particular via at least one wall that delimits the chamber 44 at least partially. Through this heat transfer, the actuating element 42 is heated, as a result of which the actuating element 42 expands.

Figure 2:
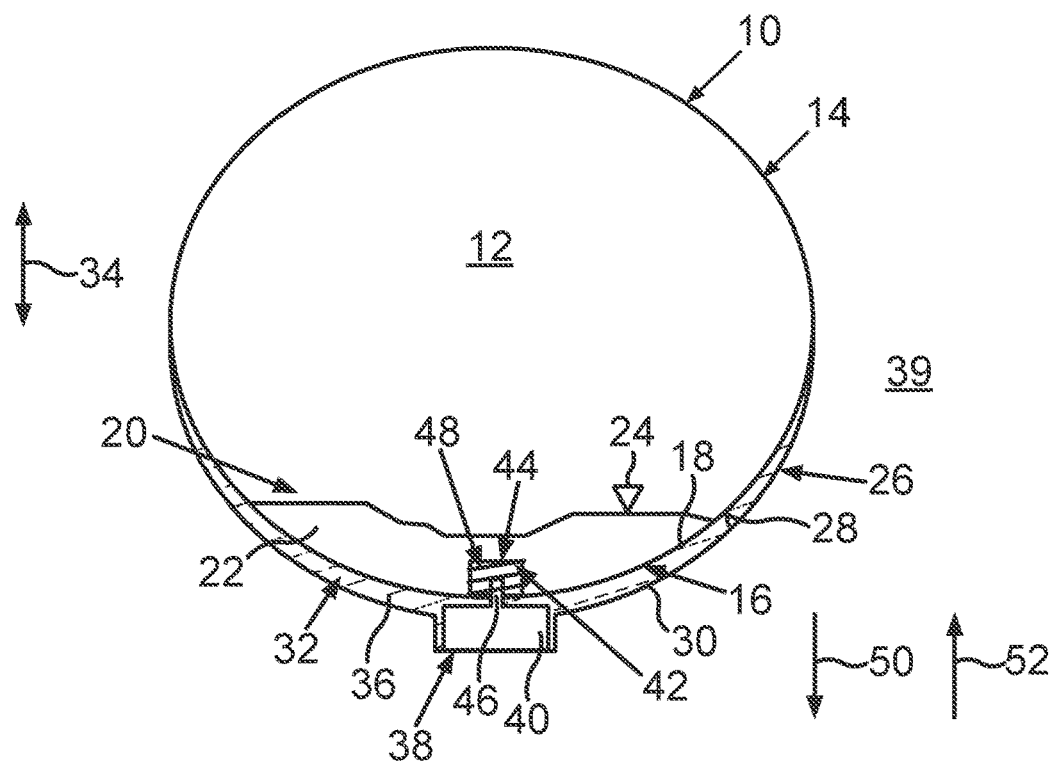
FIG. 2 as an excerpt, another schematic sectional view of the drive component, the lubricant of which has a second temperature, which is higher than the first temperature.

FIG. 2 shows the drive component 10 in this heated state, in which the drive component 10 has a second temperature that is higher in comparison to the first temperature. As a consequence of the heating of the actuating element 42, the actuating element 42 expands. Owing to this expansion, the piston 46, which is situated in the chamber 44 and is in contact with the actuating element 42, is moved and, in particular, forced at least partially out of the chamber 44, as a result of which the plunger 40 is moved in a first direction, which is indicated overall by an arrow 50 in FIG. 1. The plunger 40 is thereby moved at least partially into the reservoir 38. As a result, the plunger 40 displaces at least a part of the liquid 36 received in the reservoir 38, so that at least this part of the liquid 36 is displaced into the intermediate space 32. Accordingly, the liquid that is displaced by means of the plunger 40 fills at least a part of the intermediate space 32. The heat transfer coefficient between the lubricant 22 in the inner housing element 18 and the outer housing element 30 is thereby increased in comparison to its value at the first temperature and a thermal bridge is created to the outer housing element 30, in particular the surface thereof, and accordingly to the surroundings 39. If the lubricant 22 and the actuating element 42 again cool down, then the actuating element 42, which is formed from wax, for example, again contracts.

Through the movement of the plunger 40 in the first direction, the spring element 48 is tensioned. The spring element 48 thereby provides a spring force. If the actuating element 42 again contracts, then the plunger 40 can be moved by means of the spring force in a direction that is opposite to the first direction and is indicated in FIG. 1 by an arrow 52, so that the piston 46 is again moved at least partially into the chamber 44. In other words, the plunger 40 is brought again into an initial position by the spring force, as a result of which the plunger 40 frees up the reservoir 38 for the liquid that was present initially in the intermediate space 32. Accordingly, the liquid that was previously displaced into the intermediate space 32 can flow out of the intermediate space 32 and back into the reservoir 38 owing to the force of gravity, so that the intermediate space 32 is evacuated.

Accordingly, as an energy source for filling the intermediate space 32 with the liquid 36, the energy loss of the drive component 10 is employed, because, in the form of heat, this energy loss heats the actuating element 42. Furthermore, because the movement of the plunger 40 back in the second direction is effected by means of the spring element 48, the filling of the intermediate space 32 with the liquid 36, the discharge of the liquid 36 out of the intermediate space 32, and accordingly the setting of the heat transfer coefficient between the walls 16 and 26 can occur fully independently of any energy system, energy source, or energy storage unit of the rest of the vehicle and, accordingly, can be employed without any problem in apparatuses or assemblies that usually have no mechanical, electric, and/or hydraulic connection to a vehicle-internal energy source of the rest of the motor vehicle.

The invention claimed is:

1. A drive component for a motor vehicle, comprising:
at least one receiving space for structural elements of the drive component, with at least one first wall that delimits the receiving space at least partially, by way of which at least one collecting region for collecting a lubricant for lubricating the structural elements is delimited at least partially;
at least one second wall, which is arranged on a side of the first wall that faces away from the collecting region and which is spaced apart from the first wall at least in a partial region, so that, between the walls, an intermediate space that is delimited at least partially by the walls is formed, wherein, for setting a heat transfer coefficient between the walls, a liquid can be introduced into the intermediate space and can be discharged out of the intermediate space;
at least one reservoir, which is in fluidic connection with the intermediate space, for taking up the liquid; and
at least one displacement element, which can be moved at least partially into the reservoir in order to thereby bring about a displacement of at least a part of the liquid out of the reservoir into the intermediate space, wherein both the intermediate space and the reservoir are separated from both the receiving space and the collecting region by the first wall.

2. The drive component according to claim 1, wherein at least one actuating element is provided, the form of which and/or the volume of which can be changed as a consequence of a change in temperature of the actuating element, whereby the movement of the displacement element into the reservoir can be brought about.

3. The drive component according to claim 2, wherein the actuating element is formed as an expansion element, which, as a consequence of a heating thereof, expands and thereby brings about the movement of the displacement element into the reservoir.

4. The drive component according to claim 2, wherein the actuating element has a higher thermal expansion coefficient than does the lubricant and/or than does the liquid.

5. The drive component according to claim 2, wherein the actuating element is formed from wax.

6. The drive component according to claim 1, wherein the reservoir is arranged at least partially in the vertical direction of the vehicle below the intermediate space.

7. The drive component according to claim 1, wherein the displacement element, which can be moved at least partially in a first direction into the reservoir, is assigned at least one spring element, which can be tensioned by the movement of the displacement element, for providing a spring force, by means of which the actuating element can be moved in a second direction that is opposite to the first direction.

8. The drive component according to claim 1, wherein at least one actuator or control element that is independent of energy sources of the rest of the vehicle is provided, by means of which the displacement element can be moved.

9. The drive component according to claim 1, wherein the drive component is designed as a transmission or as an axle drive.

* * * * *